(12) United States Patent
Sekitani

(10) Patent No.: US 6,633,787 B1
(45) Date of Patent: Oct. 14, 2003

(54) PRODUCTION MACHINE

(75) Inventor: Hiroyuki Sekitani, Kani (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/458,979

(22) Filed: Dec. 10, 1999

(30) Foreign Application Priority Data

Jan. 21, 1999 (JP) .......................................... 11-012629

(51) Int. Cl.[7] .............................................. G06F 19/00
(52) U.S. Cl. .......................................... 700/96; 700/180
(58) Field of Search ........................ 700/95, 159, 175, 700/180, 216, 222, 232, 96, 108, 109, 110, 117, 106, 182, 83; 705/27, 29, 26, 28; 379/93.12; 345/837, 838, 854

(56) References Cited

U.S. PATENT DOCUMENTS

| | | | |
|---|---|---|---|
| 4,621,410 A | * 11/1986 | Williamson | 483/1 |
| 4,827,423 A | * 5/1989 | Beasley et al. | 700/96 |
| 5,124,908 A | * 6/1992 | Broadbent | 700/83 |
| 5,146,404 A | * 9/1992 | Calloway et al. | 705/1 |
| 5,216,612 A | * 6/1993 | Cornett et al. | 700/96 |
| 5,353,401 A | * 10/1994 | Iizawa et al. | 345/763 |
| 5,402,349 A | * 3/1995 | Fujita et al. | 700/97 |
| 5,806,069 A | * 9/1998 | Wakiyama et al. | 707/102 |
| 5,845,288 A | * 12/1998 | Syeda-Mahmood | 707/102 |
| 5,877,961 A | * 3/1999 | Moore | 345/835 |
| 5,884,315 A | * 3/1999 | Dunn | 707/102 |
| 5,933,353 A | * 8/1999 | Abriam et al. | 700/182 |
| 5,986,657 A | * 11/1999 | Berteig et al. | 345/792 |
| 6,038,486 A | * 3/2000 | Saitoh et al. | 700/9 |
| 6,138,056 A | * 10/2000 | Hardesty et al. | 700/174 |
| 6,345,259 B1 | * 2/2002 | Sandoval | 705/7 |
| 6,385,497 B1 | * 5/2002 | Ogushi et al. | 700/110 |
| 6,445,959 B1 | * 9/2002 | Poth | 700/28 |

FOREIGN PATENT DOCUMENTS

| JP | 6-127825 | 5/1994 |
|---|---|---|
| JP | 8-123523 | 5/1996 |

\* cited by examiner

Primary Examiner—Jayprakash N. Gandhi
Assistant Examiner—Paul Rodriguez
(74) Attorney, Agent, or Firm—Armstrong, Westerman & Hattori, LLP

(57) ABSTRACT

A production machine that allows a machine user to accurately and simply determine a parts code for a desired part in order to replace a defective or exhausted part. A production machine includes a production machine body and a controller for controlling the machine. The controller has a parts registration device for registering therein information identifying parts constituting the production machine body and a parts retrieval device. The controller preferably includes a parts identification information transmission device for transmitting parts identification information retrieved by the parts retrieval device, to an information processing device of a parts supplier. The parts retrieval device includes a specification device for specifying a part and a parts device for allowing a display device to display a parts code for the specified part. The parts display device can enlarge each component of the production machine body as required.

4 Claims, 5 Drawing Sheets

PRODUCTION MACHINE

BACKGROUND OF THE INVENTION

1. Field of the Invention

The present invention relates to a production machine such as a machine tool, and in particular, to a production machine operative in replacing a defective or an exhausted part to allow parts identification information such as a parts code for this part to be simply obtained.

2. Description of the Related Art

In general, if any part constituting a production machine becomes defective or exhausted and must be replaced with a new one, a machine user provides rough information on the part to a service office such as a production factory for this machine. For example, the information indicates a "bracket used to mount a product A."

Based on the received information, the service office identifies the production machine, checks parts notes and drawings used for it, and then specifies a parts code. The service office sends the identified part to the machine user or visits the installation site of the production machine for replacement. FIG. 6 shows an example in which the production machine is a punch press, but the above process is applicable to other production machines.

It requires the service office a large amount of time and labor to determine the parts code based on rough information, because there are large numbers of parts and parts types. If the part cannot be determined, the service office may dispatch their staff to the site.

In addition, it takes a large amount of time for the machine user to provide parts information to the service office and receive the part. It also takes a large amount of time until the machine is recovered. In particular, if the part is related to a basic operation of the machine, the operation of the machine must be completely suspended and thus the production schedule must be delayed.

If the machine user can provide detailed information on the part to the service office, the service staff does not have to visit the site because they can determine the part from the information. It saves time and labor. It is, however, difficult for the machine user to provide detailed information on the part.

An object of the present invention is to provide a production machine that enables a machine user to accurately and simply determine a desired part.

Another object of the present invention is to provide a production machine that simplifies the machine user's task to determine a desired part and place an order for it.

Yet another object of the present invention is to enable the machine user to easily confirm a parts code that is identification information on the desired part.

SUMMARY OF THE INVENTION

A configuration of the present invention will be described with reference to FIG. 1 corresponding to an embodiment.

This production machine comprises a production machine body 1 and control means 2 attached to the production machine body 1 to control it. The control means 2 has parts registration means 11 for registering therein information identifying parts constituting the production machine body 1 and parts retrieval means 12 for retrieving parts from the parts registration means 11.

In this manner, the parts registration means 11 and the parts retrieval means 12 are provided in the control means 2 attached to the production machine body 1, so identification information on a desired part such as a defective or an exhausted part to be replaced can be obtained on the production machine. Besides, the control means 2 acts as both the parts registration means 11 and the parts retrieval means 12, thereby only a simple configuration is required by eliminating the use of an additional computer.

In a production machine according to the present invention, the control means 2 comprises parts identification information transmission means 14 for transmitting parts identification information retrieved by the parts retrieval means 12, to information processing means 22 of a parts supplier.

In this manner, both the parts retrieval means 12 and the parts identification information transmission means 14 are provided in the control means 2, so the retrieved parts identification information can be directly provided as an order. Thus, the task to determine a desired part and order it is simplified and errors in posting parts identification information can be prevented.

In a production machine according to the present invention, the parts retrieval means 12 comprises parts specification means 18 for specifying a part and parts display means 19 for allowing a display device 17 to display a parts code that is identification information on the specified part.

If the display device 17 displays the parts code for the part specified by the parts specification means 18, the parts code can be simply confirmed.

DETAILED DESCRIPTION OF THE PREFERRED EMBODIMENTS

Figure 1:
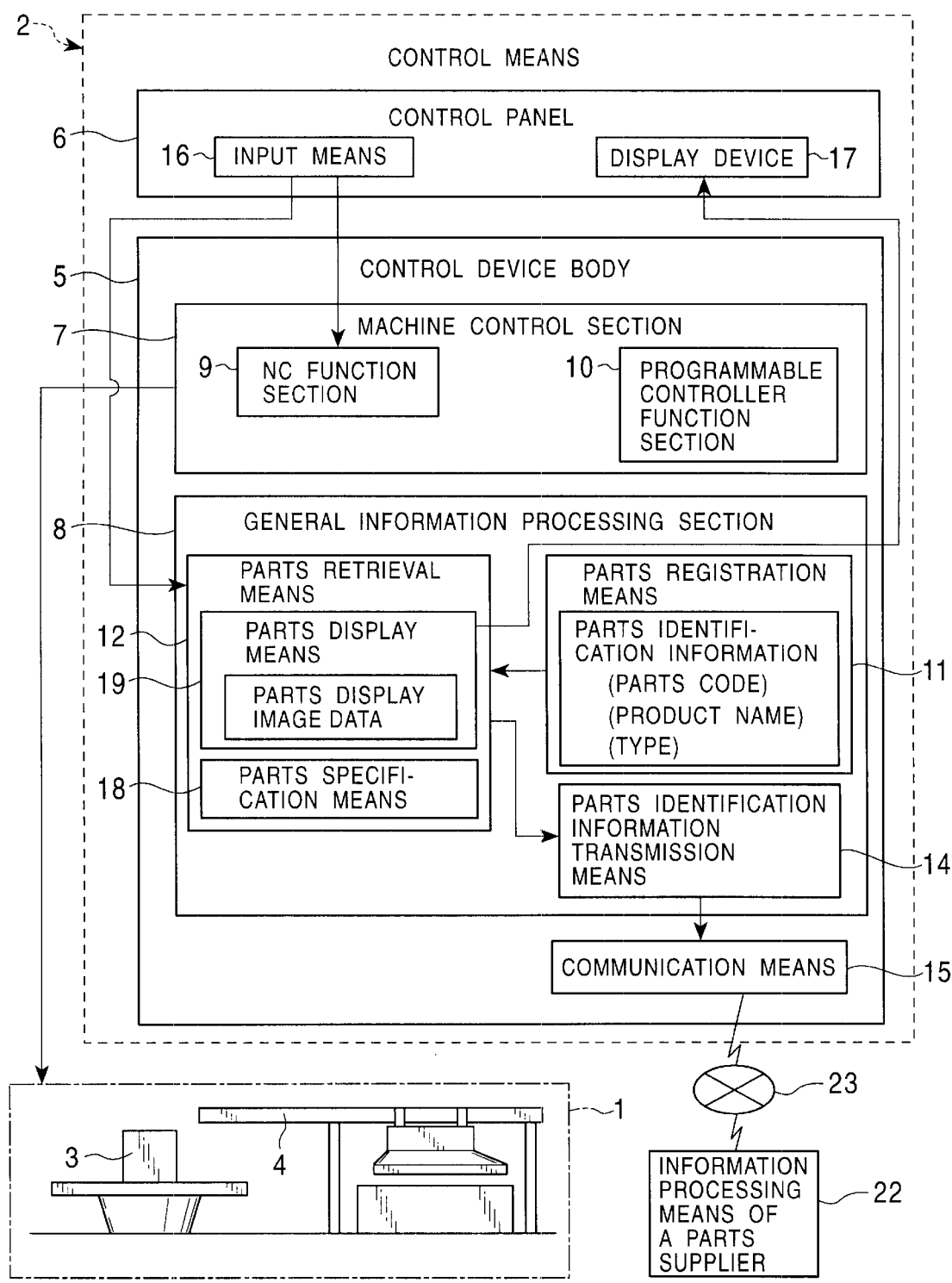
FIG. 1 is a block diagram showing a conceptual configuration of a production machine according to one embodiment of the present invention.

One embodiment of the present invention will be described with reference to FIGS. 1 to 5. This production machine comprises a production machine body 1 and a control means 2 attached to the production machine body 1 to control it. The production machine 1 is comprised of a plurality of component machines 3, 4.

The component machine 3 is a machine tool, and the component machine 4 is a transfer device. In this embodiment, the component machine 3 comprising a machine tool is a plate working machine and for particulars, a punch press. The component machine 4 comprising a transfer device loads and unloads a work piece on and from the component machine comprising a machine tool. The production machine body 1 may comprise a single component machine.

The control means 2 comprises a control device body 5 comprised of a computer device such as a personal computer and its control panel 6. The control means 2 is installed near the production machine body 1 or on a cover of the production machine 1. The control device body 5 comprises a machine control section 7 for controlling the production machine body 1, a general information processing section 8 that is not directly involved with the control of the production machine body 1, and communication means 15.

The machine control section 7 comprises an NC function section 9 for numerical control and a programmable controller function section 10 mainly engaged in sequence control. The NC function section 9 and the programmable controller function section 10 may be separately provided for the individual component machines 3, 4 of the production machine body 1 or may be used to control all of the plurality of component machines 3, 4.

The communication means 15 comprises equipment, parts, and control programs that communicate with information processing means constituting a network together with the general information processing means 8.

The control panel 6 comprises input means 16 comprising a pointing device such as a mouse and key switches, and a display device 17 comprising such as a CRT or a liquid crystal display panel. The control panel 6 may be installed on an enclosure of the control device body 5 or away from the control device body 5.

The general information processing section 8 comprises parts registration means 11 for registering identification information on components of the production machine 1 and parts retrieval means 12 for retrieving parts from the parts registration means 11, and further includes a parts identification information transmission means 14.

The parts registration means 11 is storage means in which parts codes are registered as identification information for identifying the components of the production machine 1 or in which parts names and types are registered together with the parts codes. The parts registration means 11 constitutes a database. The parts registration means 11 may be storage means such as a hard disc that is provided in a computer constituting the control device body 5 and in which information is registered or may be storage means from which information can be read via a disc drive in the computer constituting the control device body 5.

Figure 3:
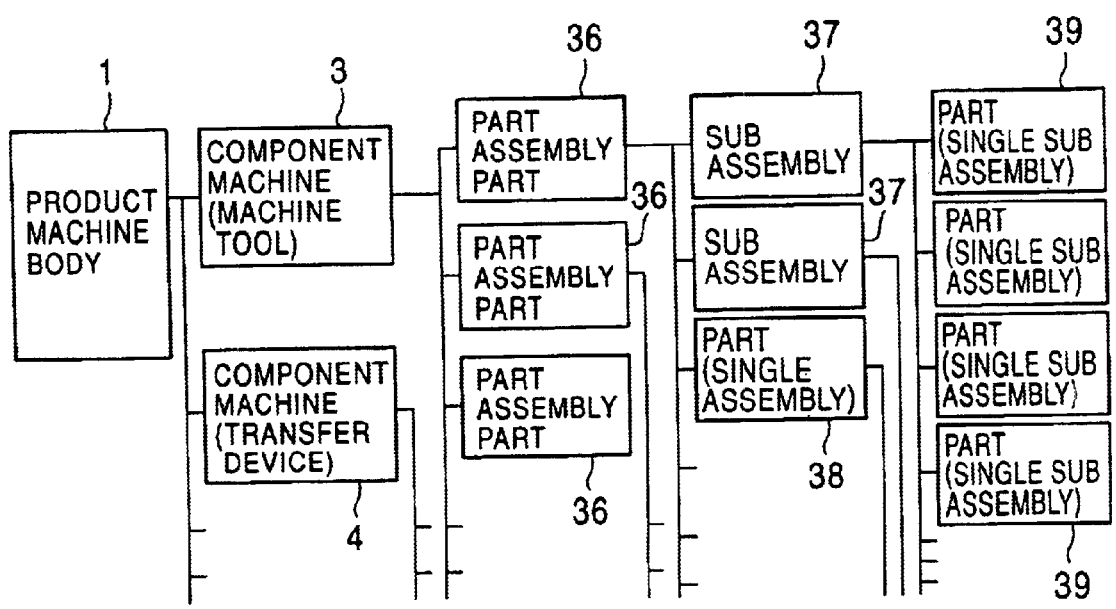
FIG. 3 is an explanatory drawing showing an example of a hierarchical relationship among parts identification information registered by parts registration means of the production means.
Figure 4:
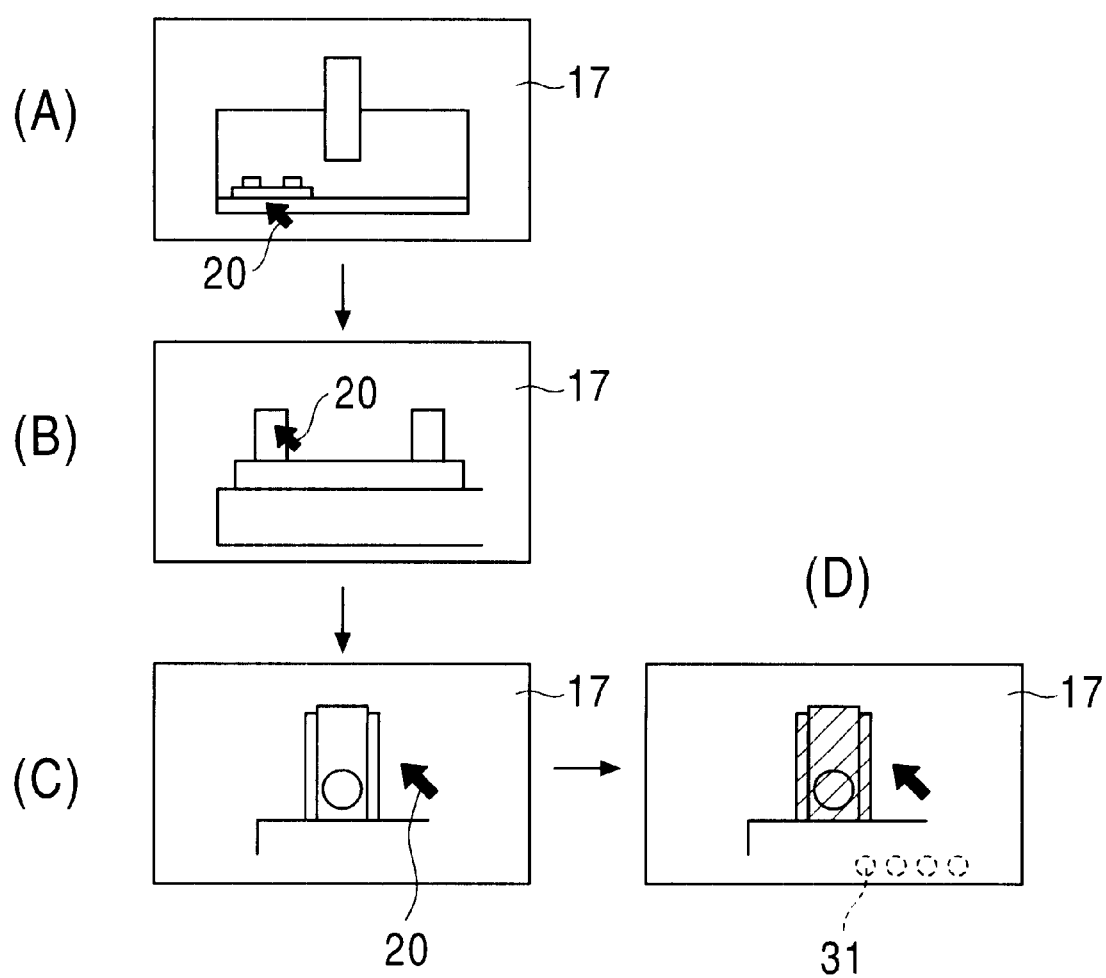
FIG. 4 is an explanatory drawing showing examples of screens of a display device in control means of the production machine.

As conceptually shown in the example in FIG. 3, parts identification information is hierarchically classified for registration. Part assembly parts 36 are registered for each of the component machines 3, 4 constituting the production machine body 1, subassemblies 37 and parts (single assembly) 38 constituting each of the part assembly parts 36 are then registered, and for each of the subassemblies 37, parts (single subassembly) 39 and lower parts assembly parts (not shown in the drawings) are registered. The lowest components or parts assembly parts in each hierarchical system are minimum units used by, for example, the user of the production machine body 1 to order parts from a supplier. Part assembly parts 36 and subassemblies 37 are typically called "assembly parts" and in, for example, a punch press, include a punch drive device or a table device, or a crank mechanism or a table feed mechanism constituting these devices, and so on. Parts constituting the part assembly parts are a crank and a work piece holder, and so on. Each of the part assembly parts 36 and subassemblies 37 is included in the parts set forth in Claims.

The parts retrieval means 12 comprises a parts specification means 18 for specifying a part and a parts display means 19 for allowing the display device 17 to display a parts code that is identification information on the specified part, and reads from the parts registration means 11, identification information on a part specified by the parts specification means 18 in order to allow the display device 17 to display the information.

The parts display means 19 allows the display device 17 to display components and parts of the production machine body 1 in drawings or images in photographs, and can also use a parts code character display 31 (FIG. 4D) to display a parts code that is parts identification information and that corresponds to the parts image. The parts display means 19 has parts display image data used to display the image. The parts display image data may be registered in storage means such as a hard disc provided in a computer constituting the control device body 5 or may be stored in a portable storage medium such as an optical disc so as to be read therefrom via a disc drive in the computer constituting the control device body 5. If the parts display image data is stored in a portable storage medium, it may be stored in the same storage medium as the one constituting the parts registration means 11.

In addition, the parts display means 19 may comprise a function for displaying a list of parts such as a parts note in addition to the above image. Preferably, the parts list is, for example, a diagram showing a hierarchy as illustrated in FIG. 3. If a single screen cannot accommodate the overall list, a plurality of screens may be hierarchically displayed, or screen scroll or enlarged display may be used to display the overall list.

The parts display means 19 can enlarge an image of a component of the production machine body 1 to the extent that a desired part specified by the parts specification means 18 can be identified. For example, as shown in the example of a screen of the display device 17 in FIG. 4, the parts display means 19 can incrementally enlarge an image as shown in seen in FIG. 4 as an image showing the overall component machine 3 of the production machine body 1 (FIG. 4A), an image showing its work piece feed device (FIG. 4B), and an image showing a work piece holder that is an component of the work piece feed device (FIG. 4C), or can enlarge the image in arbitrary units such as percents. Furthermore, the parts display means 19 is configured so that an image of the production machine body 1 as seen from each direction or a cross section or perspective view of each part can be subjected to various enlargements as described above.

The parts specification means 18 enables a desired part to be specified by using the input means 16 to specify a desired site in an image shown on the screen of the display device 17 by the parts display means 19. The input means 16 can be used to specify the desired site in the image by using the pointing device to place at the desired site a cursor 20 (FIG. 4) on the screen and performing a click operation to enter a selective command. Whether the entry of the selective command indicates a parts assembly part or its component can be determined by specifying entry rules for the selective command beforehand. The entry rules may comprise an approach for determining that a parts assembly part has been selected when an entry is made while the display device 17 is displaying an entry screen for parts assembly parts, while determining that an individual part has been selected when an entry is made while the display device 17 is displaying an entry screen for individual parts, or an approach for distinguishing entries from one another based on a site of a part at which the cursor is pointing even though the cursor is pointing to the same part in the same screen. In addition, the parts display means 19 has a function for displaying an image of the part selected or specified by the parts specification means 18 (for example, the shaded image in FIG. 4D) in such a way that it appears different from the other images, using a different color or density.

Instead of or in conjunction with the method for specifying a desired site as described above, the parts specification means 18 may allow a desired part to be specified using the input means when it is displayed in a parts list displayed on the screen.

The parts identification information transmission means 14 transmits parts identification information retrieved by the parts retrieval means 12, to an information processing means 22 such as a computer in a parts supplier, and carries out transmissions via a communication means 15 and a network 23 such as a telephone circuit network. Specifically, the parts identification information transmission means 14 transmits predetermined information required to order a part with parts identification information added thereto. The predetermined information required to order a part includes fixed information such as supplier information and an order request intention, the desired number of parts, and information such as a delivery date that can be changed upon an order.

Figure 2:
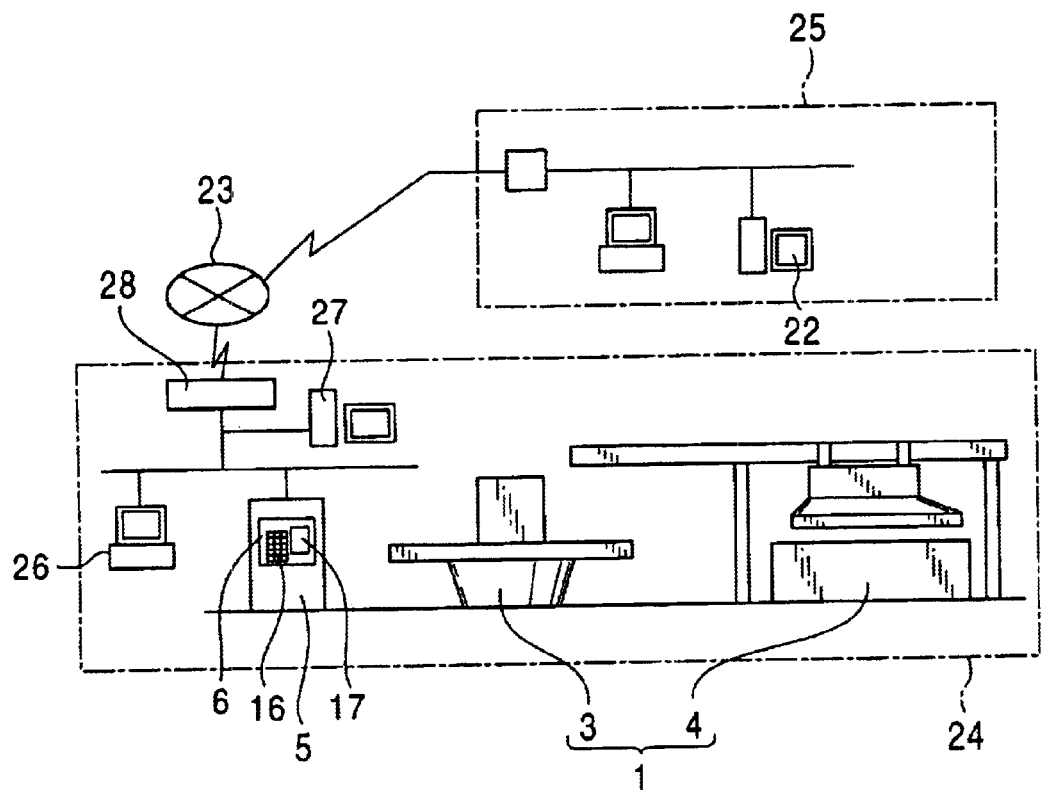
FIG. 2 is a block diagram showing the network between the production machine and information processing means of a supplier.

FIG. 2 shows an example of the relationship between a local area network 24 in a factory in which this production machine is installed and a local area network 25 including the information processing means 22 of a supplier. The general information processing section 8 (FIG. 1) of the this production machine constitutes the local area network 24 together with a web server 27, a communication control device 28, and network component equipment such as another computer, a printer, or a machine control device. A network 23 connecting both local area networks 24, 25 together consists of Internet or a wide area network called an "intranet."

Figure 5:
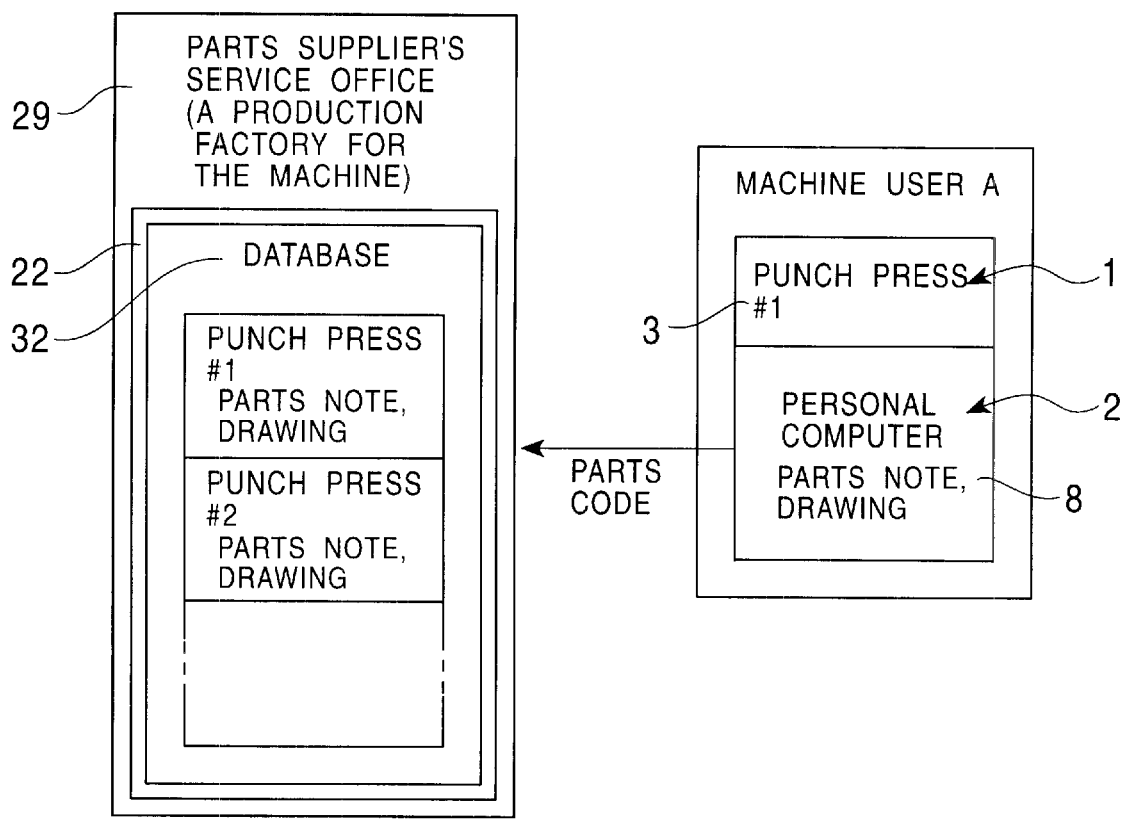
FIG. 5 is an explanatory drawing showing data transmission or processing between the production machine and a service office that is a supplier.
Figure 6:
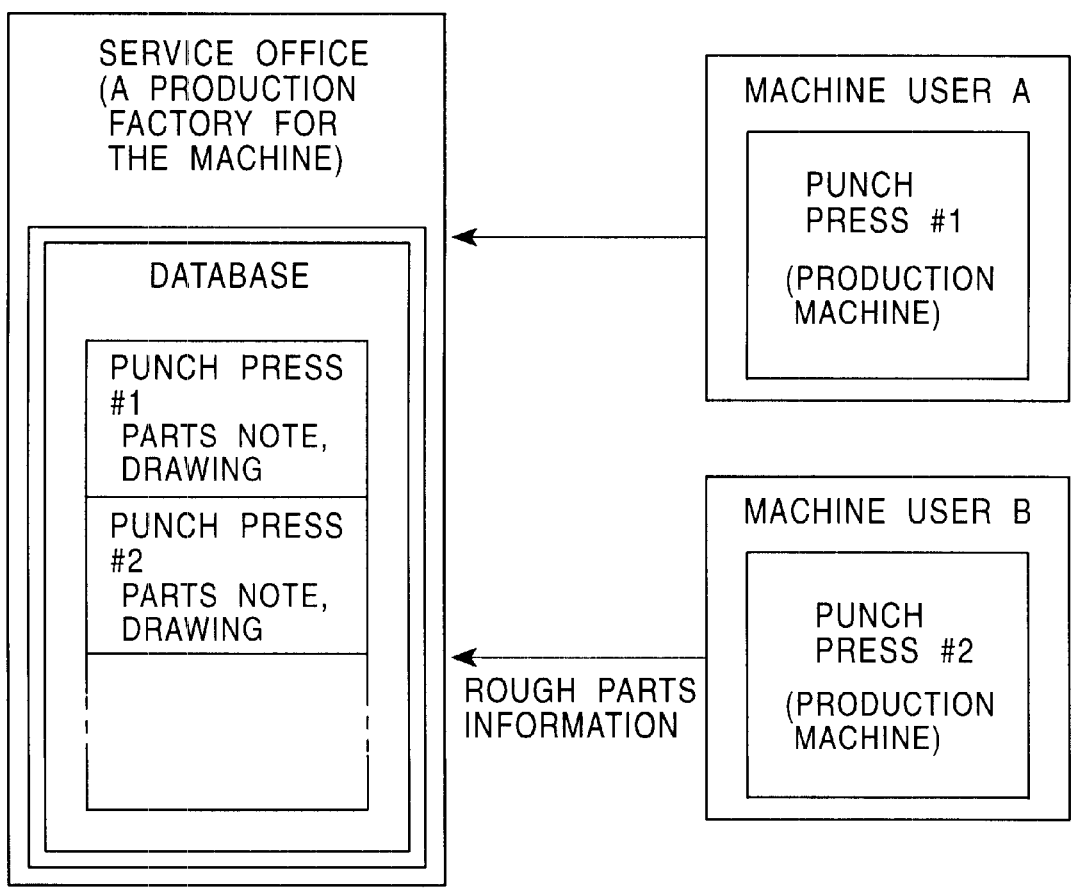
FIG. 6 is an explanatory drawing of a conventional example.

As shown in FIG. 5, a database 32 is provided in the information processing means 22 of a service office 29 (for example, a production factory for the production machine) that is a supplier or an information processing means connected to the information processing means 22 through a local area network 25 (FIG. 2). The database 32 comprises, for each production machine dealt by the service office 29, parts notes (parts lists) and drawings for the production machine body to manage stock information on a part corresponding to a parts code transmitted from the machine user's control means 2 (FIG. 1), as well as order and delivery information.

The operation of the above configuration will be described.

If any part of the production machine body 1 must be replaced with a new one due to exhaustion or a defect, the user displays images of the production machine body 1 and its component machines 3, 4 or their components on the display device 17 of the control means 2 attached to the production machine body 1. In this display state, the user clicks and specifies a mechanical portion to which a part to be replaced is attached, in order to determine a parts code for the replaced part from parts codes displayed on the screen of the display device 17 as a result of the specification. In this case, the part can be more specifically specified by gradually enlarging a drawing or an image in a photograph displayed on the screen.

In this manner, the machine user can simply determine the parts code and must communicate only the identified parts code to the service office 29 (FIG. 5) that is a supplier, thereby eliminating the need to identify the part thus reduce the time required for preparing the part.

Although the above embodiment communicates the parts code to the service office 29 that is a supplier, the parts identification information transmission means 14 (FIG. 1) may transmit a screen through which the parts specification means 18 has specified the part so that the information processing means 22 of the service office 29 can reproduce this screen. In this case, the information processing means 22 of the service office 29 has a function for identifying the parts code using the screen information. Consequently, the production machine side must have only parts display image data without the parts registration means for registering parts codes, product names and so on therein.

The production machine according to the present invention comprises the production machine body and the control means attached to the production machine body to control it. The control means has the parts registration means for identifying parts constituting the production machine body and the parts retrieval means for retrieving parts from the parts registration means. Thus, the machine user can accurately and simply determine the desired part.

If the control means comprises the parts identification information transmission means for transmitting parts identification information retrieved by the parts retrieval means, to the information processing means of the parts supplier, this configuration simplifies the machine user's task to determine a desired part and order it.

If the parts retrieval means comprises the parts specification means for specifying a part and the parts display means to display a parts code that is identification information on the specified part on the display device, the machine user can easily confirm the parts code for the desired part.

What is claimed is:

1. A production machine comprising:

a production machine body; and control means mounted on a cover of the production machine body for controlling said production machine body, wherein the control means includes a parts registration means for registering therein parts identification information constituting said production machine body and a parts retrieval means for retrieving parts from the parts registration means, wherein said parts retrieval means comprises parts specification means for specifying a part and a parts display means for allowing a display device to display a parts code that is identification information for the specified part, wherein said parts specification means enables a desired part to be specified by using an input means to specify a desired site in an image of components and parts of the production machine body shown on a screen of the display device by the parts display means, wherein said input means specifies the desired site in the image by using a pointing device to place a cursor at a desired site on the screen and performing a click operation to enter a selective command, wherein entry of the selective command indicates a parts assembly part or its component can be determined by specifying entry rules for the selective command beforehand, and wherein said entry rules comprise an approach for determining that a parts assembly part has been selected when an entry is made while the display device is displaying an entry screen for parts assembly parts while determining that an individual part has been selected when an entry is made while the display device is displaying an entry screen for individual parts.

2. A production machine as recited in claim 1, wherein said control means comprises parts identification information transmission means for transmitting the parts identification information retrieved by said parts retrieval means to information processing means of a parts supplier.

3. A production machine as recited in claim 2, wherein said parts identification information is described in a design drawing used to design said production machine body.

4. A production machine as recited in claim 3, wherein a database of said parts supplier stores said design drawing.

* * * * *